United States Patent [19]

Kuriyama et al.

[11] 4,427,928
[45] Jan. 24, 1984

[54] BRAKING CONTROL APPARATUS FOR AN ELECTRIC MOTOR OPERATED VEHICLE

[75] Inventors: Shigeru Kuriyama, Katsuta; Kiyosi Nemoto, Naka; Michimasa Horiuchi, Katsuta, all of Japan

[73] Assignee: Hitachi, Ltd., Tokyo, Japan

[21] Appl. No.: 259,161

[22] Filed: Apr. 30, 1981

[30] Foreign Application Priority Data

May 6, 1980 [JP] Japan .................... 55-58721

[51] Int. Cl.³ .................... H02P 3/12; H02P 7/00
[52] U.S. Cl. .................... 318/139; 318/287; 318/296; 318/376
[58] Field of Search ............... 318/139, 280, 283, 287, 318/296, 376, 373

[56] References Cited

U.S. PATENT DOCUMENTS 4,049,998  9/1977  Boxer .................... 318/139
4,057,752  11/1977  Artrip et al. .................... 318/139

Primary Examiner—J. V. Truhe
Assistant Examiner—A. Evans
Attorney, Agent, or Firm—Antonelli, Terry & Wands

[57] ABSTRACT

A braking control apparatus for an electric motor operated vehicle including contactors for controlling the direction of rotation of a DC electric motor to effect change-over between the forward and backward modes of running of the vehicle, and a chopper circuit whose duty cycle is varied in response to the accelerator position is disclosed to comprise forward/backward change-over detecting means for detecting a change-over from the forward mode of running to the backward mode of running or vice versa, and regenerative braking activating means for effecting regenerative braking whe the forward/backward change-over detecting means detects the occurrence of change-over from the forward to the backward mode of running or vice versa.

2 Claims, 3 Drawing Figures

BRAKING CONTROL APPARATUS FOR AN ELECTRIC MOTOR OPERATED VEHICLE

BACKGROUND OF THE INVENTION

The present invention relates to braking control apparatus for electric motor operated vehicles and more particularly to a braking control apparatus provided with a dynamic braking control circuit and well suited for use with battery operated fork lift trucks.

A type of braking control apparatus for electric motor operated vehicles in which regenerative braking is effected first and then plugging braking is effected in response to the movement of a forward/backward change-over device to the reverse position while an electric motor operated vehicle is in the forward running, is disclosed in U.S. Pat. No. 4,124,812 issued on Nov. 7, 1978 to Naito et al. In this apparatus, after the vehicle is stopped by the plugging braking in the above-mentioned manner, the vehicle is allowed to run backward by simply turning on the chopper again to start the control of duty cycle and thus the apparatus is well suited for use with the battery operated fork lift truck which is subject to frequent forward and backward movements.

To effect regenerative braking, it is necessary to change the connection of the main circuit from a motor circuit to a regenerative braking circuit by means of a regeneration braking contactor. This switching operation is carried out when the accelerator position is greater than a predetermined value and the duty cycle of the chopper circuit is approximately 100% and also the forward/backward change-over device is in operation.

As a result, in the above apparatus, when the forward/backward change-over device is first moved from the forward position to the neutral position and then to the forward position again or when the change-over device is first moved from the reverse position to the neutral position and then to the reverse position again, the main circuit connection is always changed to the regenerative braking circuit. Consequently, this apparatus has a drawback such that when the change-over device is moved from the forward (or reverse) position to the neutral position and then to the forward (or reverse) position, the motor drive (power running) circuit is not established immediately resulting in slow response in movement of the vehicle. Another drawback is that since the contactor must operate whenever the change-over device is changed from the forward to the neutral position and then from the neutral to the forward position or from the reverse to the neutral position and then from the neutral to the reverse position, the contactor is subjected to frequent operation so that its life is decreased.

Further, the transition from the regenerative braking to the plugging braking is carried out upon detecting that the duty cycle of the chopper in the regenerative braking mode has reached a predetermined value, such as, about 70 to 100%, and the regeneration contactor is closed after the chopper duty cycle has been reduced to zero % or after the operation of the chopper has been stopped. As a result, there is no braking force during the transition period (about 0.1 to 0.4 seconds) so that the coasting distance is increased and the driver may feel as if no deceleration were effected.

SUMMARY OF THE INVENTION

It is therefore an object of the present invention to provide a braking control apparatus for electric motor operated vehicles in which the operation frequency of a regenerative braking contactor is reduced and its life is increased.

It is another object of the present invention to provide a braking control apparatus for electric motor operated vehicles which is so designed that when a forward/backward change-over device is changed from the forward (or reverse) position to the neutral position and immediately to the forward (or reverse) position again, a motor drive circuit is rapidly established for operation resulting in fast response in movement of the vehicle.

It is still another object of the invention to provide a braking control apparatus for electric motor operated vehicles which is so designed that the change-over from regenerative braking to plugging braking is effected in a short period of time and the distance of idle running is reduced.

A feature of the present invention resides in that the duty cycle of a chopper circuit is detected to detect the speed of a vehicle and the output of an accelerator is detected and that a detector is provided which operates, in response to the vehicle speed and the accelerator output in excess of predetermined respective values and operation of a switch which is different from the one which has operated before movement of a forward/backward change-over device to a neutral position, to change the connection of a main circuit to a regenerative braking circuit.

DESCRIPTION OF THE PREFERRED EMBODIMENTS

Figure 1:
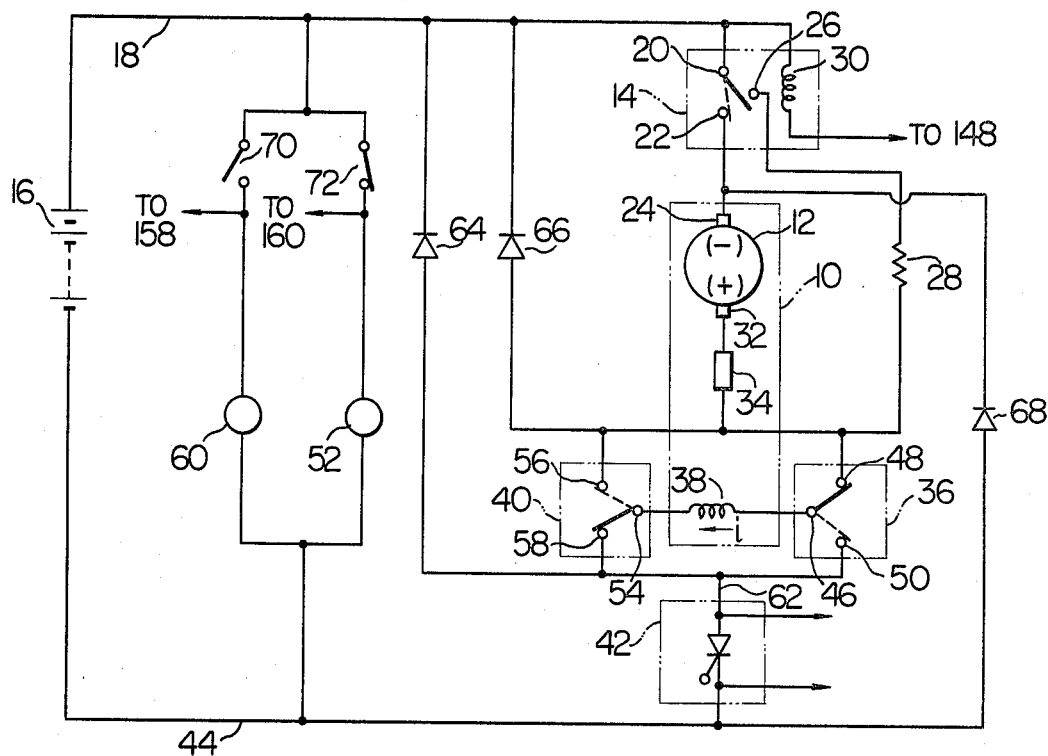
FIGS. 1 and 2 are circuit diagrams showing an embodiment of the present invention.
Figure 2:
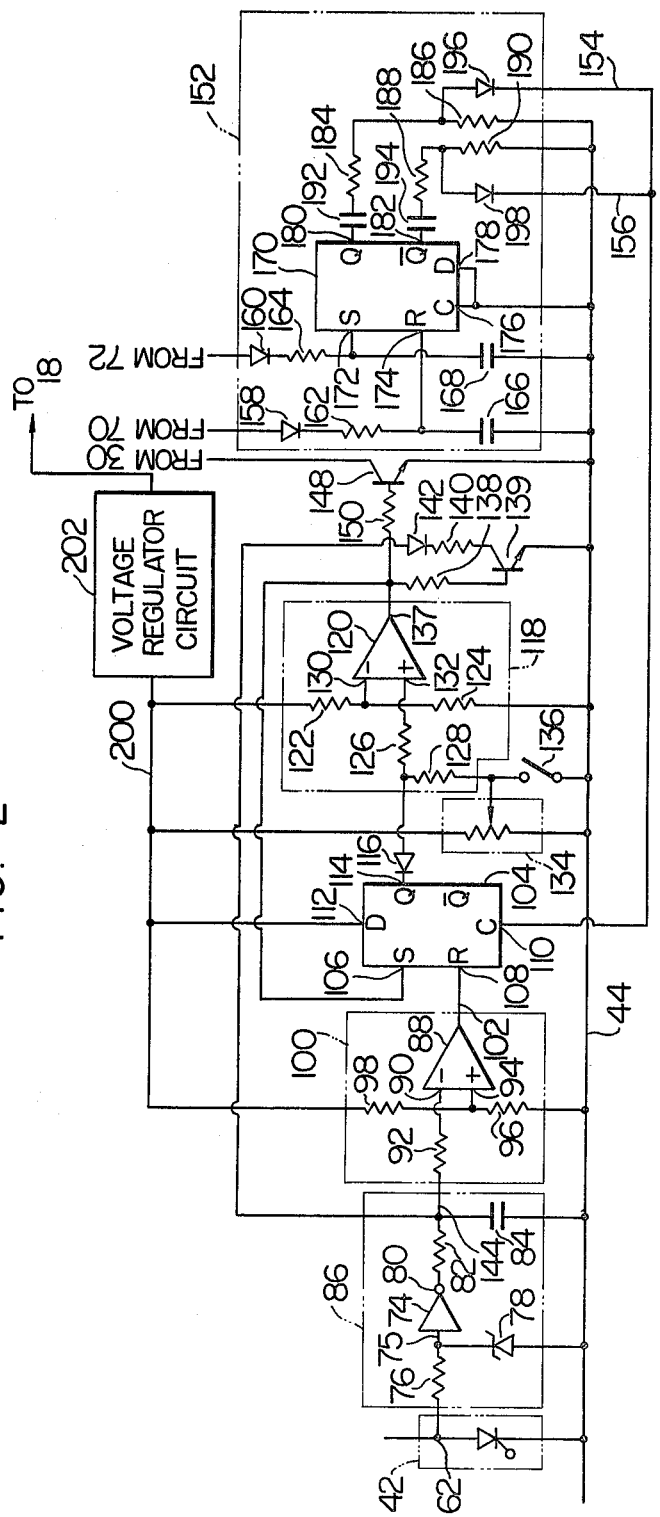

Referring to FIGS. 1 and 2, an armature 12 of a DC electric motor 10 is connected to a positive terminal 18 of a DC power source 16 via a regenerative braking contactor 14. The contactor 14 has its terminal 20 connected to the power source positive terminal 18, its terminal 22 connected to a positive terminal 24 of the armature 12 and its terminal 26 connected to a preliminary excitation resistor 28. When an excitation coil 30 is energized, as shown by the solid line, a connection is made between the terminals 20 and 26 and a regenerative braking circuit is established. When the excitation coil 30 is deenergized, as shown by the dotted line, the terminals 20 and 22 are connected and a motor circuit is established.

A negative terminal 32 of the armature 12 is connected to a negative terminal 44 of the DC power source 16 through a current detecting sensor 34, a backward contactor 36, a series field coil 38, a forward contactor 40 and a chopper circuit 42. The backward contactor 36 comprises terminals 46, 48 and 50 and a control coil 52, and the forward contactor 40 comprises terminals 54, 56 and 58 and a control coil 60. In reverse operation, the control coil 52 of the backward contactor 36 is energized so that as shown by the solid lines the terminals 46 and 48 are connected and the terminals 54 and 58 are also connected, thus allowing a current i to flow through the series coil 38 in the direction of the arrow. In forward operation, the control coil 60 of the forward connector 40 is energized so that as shown by the dotted lines the terminals 54 and 56 are connected and the terminals 46 and 50 are also connected, thus allowing the current to flow through the series coil 38 in a direction opposite to the direction of the arrow.

The terminals 50 and 58 are connected to a positive terminal 62 of the chopper circuit 42 and are also connected to the DC power source positive terminal 18 via a free wheel diode 64. The terminals 48 and 56 are connected to the current detecting sensor 34 and the preliminary excitation resistance 28 and are also connected to the DC power source positive terminal 18 via a plugging diode 66. A regenerative braking diode 68 has its anode connected to the negative terminal of the chopper circuit 42 and its cathode connected to the positive terminal 24 of the armature 12. The forward and backward contactor control coils 60 and 52 are respectively connected in series with forward and backward switches 70 and 72. When the forward/backward change-over device is moved to the forward position the forward switch 70 is closed and the backward switch 72 is opened, while when the change-over device is moved to the reverse position the backward switch 72 is closed and the forward switch 70 is opened. When the change-over device is moved to the neutral position, both of the switches 70 and 72 are opened.

An inverter 74 has its input terminal 75 connected to the chopper circuit positive terminal 62 via a resistor 76 and to the DC power source negative terminal 44 via a Zener diode 78 and its output 80 connected to a smoothing circuit comprising a resistor 82 and a capacitor 84. The inverter 74, the resistors 76 and 82, the Zener diode 78 and the capacitor 84 form a duty cycle detecting circuit 86, and its output voltage generated across the capacitor 84 is proportional to the duty cycle of the chopper circuit 42.

A negative input terminal 90 of an operational amplifier 88 is connected to the resistor 82 via a resistor 92 and its positive input terminal 94 is connected to the junction point of resistors 96 and 98. The operational amplifier 88 and the resistors 92, 96 and 98 form a level detecting circuit 100, so that when the negative input voltage of the operational amplifier 88 is higher than a predetermined reference voltage applied to the positive input terminal 94, its output terminal 102 goes to a low level or an "off" state, and the output terminal 102 goes to a high level or an "on" state when the negative input voltage is lower than the reference voltage. In other words, when the duty cycle of the chopper circuit 42 reaches a predetermined value, e.g., 80%, the output of the level detecting circuit 100 goes to the low level.

A data-type flip-flop 104 which functions as a regeneration condition detector includes a set input terminal 106, a reset input terminal 108, a clock input terminal 110, a data input terminal 112 and an output terminal 114, and the flip-flop 104 has its reset input terminal 108 connected to the output terminal 102 of the level detecting circuit 100 and its output terminal 114 connected to a regenerative braking command circuit 118 via an inversely connected diode 116.

The regenerative braking command circuit 118 comprises an operational amplifier 120 and resistors 122, 124, 126 and 128, and the operational amplifier 120 has its negative input terminal 130 connected to the junction point of the resistors 122 and 124 and its positive input terminal 132 connected to the output terminal 114 of the D-type flip-flop 104 through the resistor 126 and the diode 116. A variable resistor 134 is provided to generate a signal corresponding to the position of the accelerator (not shown) and its output is applied to the positive input terminal 132 of the operational amplifier 120 via the resistor 128. A contact 136 is connected between the output terminal of the variable resistor 134 and the negative terminal 44 of the DC power source 16 and it is closed when the forward/backward change-over device is at the neutral position.

An output terminal 137 of the operational amplifier 120 is connected to the set input terminal 106 of the D-type flip-flop 104 and to the base of a transistor 139 via a resistor 138. The collector of the transistor 139 is connected to an output terminal 144 of the duty cycle detecting circuit 86 via a resistor 140 and an inverse diode 142 and its emitter is connected to the negative terminal 44 of the DC power source 16.

A driving transistor 148 is connected in series with the excitation coil 30 of the regenerative braking contactor 14. The transistor 148 has its collector connected to the excitation coil 30, its emitter connected to the DC power source negative terminal 44 and its base connected to the output terminal 137 of the operational amplifier 120 via a resistor 150.

A forward/backward switching operation detecting circuit 152 generates an output signal at its output terminal 154 or 156 when the forward/backward change-over device is changed from the forward to reverse position or from the reverse to forward position and the output signal is supplied to the clock input terminal 110 of the D-type flip-flop 104. A series circuit of diodes 158 and 160, resistors 162 and 164 and capacitors 166 and 168 is connected to the forward contactor 70 and the backward contactor 72. A D-type flip-flop 170 includes a set input terminal 172, a reset input terminal 174, a clock input terminal 176, a data input terminal 178 and output terminals 180 and 182, and the flip-flop 170 has its set input terminal 172 connected to the junction point of the resistor 164 and the capacitor 168, its reset input terminal 174 connected to the junction point of the resistor 162 and the capacitor 166 and its clock input terminal 176 and data input terminal 178 connected to the power source negative terminal 44. The D-type flip-flop 170 has its output terminal 180 connected to a differentiation circuit comprising resistors 184 and 186 and a capacitor 192 and its inverted output terminal 182 connected to a differentiation circuit comprising resistors 188 and 190 and a capacitor 194, and the differentiated outputs of these differentiation circuits are respectively supplied via diodes 196 and 198 to the clock input terminal 110 of the D-type flip-flop 104. A terminal 200 is connected to the power source positive terminal 18 via a voltage regulator circuit 202.

Now, assume that the forward switch 70 is closed and the backward switch 72 is opened. If the forward switch 70 is moved to open position and the backward switch 72 is moved to closing position, a charging current flows to the capacitor 168 via the diode 160 and the resistor 164. As a result, a pulse is supplied to the set input terminal 172 of the D-type flip-flop 170 and the output terminal 180 of the D-type flip-flop 170 changes from the low level to the high level. Thus, the differentiation circuit comprising the capacitor 192 and the resistors 184 and 186 generates an output pulse and the pulse is supplied to the D-type flip-flop 104.

On the contrary, assume that the forward switch 70 is opened and the backward switch 72 is closed. If the forward switch 70 is closed and the backward switch 72 is opened, a pulse is supplied to the reset input terminal of the D-type flip-flop 170 and the inverted terminal 182 goes from the low level to the high level. Thus, similarly the differentiation circuit comprising the resistors 188 and 190 and the capacitor 194 generates a pulse output and this clock pulse is supplied to the clock input terminal 110 of the D-type flip-flop 104.

However, if the forward/backward change-over device is moved from the forward position to the neutral position and then to the forward position again, no clock pulse is supplied to the clock input terminal 110 of the D-type flip-flop 104. Now assume that the forward/backward change-over device is at the forward position, the forward switch 70 is closed, the backward switch 72 is open and the output terminal 182 of the D-type flip-flop 170 is at the high level. If the forward/backward change-over device is moved to the neutral position, the forward switch 70 is opened but the D-type flip-flop output terminal 182 remains at the high level. Then, if the forward/backward change-over device is moved back to the forward position, the forward switch 70 is closed again but the D-type flip-flop output terminal 182 still remains at the high level. As a result, no clock pulse is generated via the terminals 154 and 156.

Now, if the forward/backward change-over device is moved to the forward position, the forward switch 70 is closed and the backward switch 72 is opened. In response to the closing of the forward switch 70, the control coil 60 of the forward contactor 40 is energized and the terminals 54 and 56 of the contactor 40 are connected. On the other hand, since the control coil 52 of the backward contactor 36 is in the deenergized state, the terminals 46 and 50 are connected. As a result, when the chopper circuit 42 is turned on, the current flows in a direction opposite to the direction of the arrow via a circuit comprising the DC power source 16, the positive terminal 18, the terminal 20, the terminal 22, the armature 12, the sensor 34, the terminal 56, the terminal 54, the field coil 38, the terminal 46, the terminal 50, the chopper circuit 42 and the negative terminal 44, and the DC electric motor 10 is brought into operation.

With the DC electric motor 10 operating at a predetermined rotational speed and the vehicle being moved forward at a predetermined speed, if the forward/backward change-over device is moved to the reverse position, the forward switch 70 is opened and the backward switch 72 is closed. As a result, the forward contactor control coil 60 is deenergized connecting the terminals 54 and 58 as shown by the solid line and the control coil 52 is energized thus connecting the terminals 46 and 48.

On the other hand, when the forward/backward change-over device is moved from the forward to reverse position, as described previously, a clock pulse is supplied to the clock input terminal 110 of the D-type flip-flop 104 and its output terminal 114 goes to the high level. In the regenerative braking command circuit 118, the output terminal 137 of the operational amplifier 120 goes to the high level when the output of the D-type flip-flop 104 is at the high level and also the output of the accelerator is greater than a predetermined value. When the output of the operational amplifier 120 goes to the high level, the transistor 148 is turned on so that the excitation coil 30 of the regeneration contactor 14 is energized and the terminals 20 and 26 are connected as shown by the solid line in FIG. 1.

As a result, when the chopper circuit 42 is turned on, the current i indicated by the arrow flows to the field coil 38 via the DC power source 16, the positive terminal 18, the terminal 20, the terminal 26, the preliminary excitation resistor 28, the terminals 48 and 46, the field coil 38, the terminals 54 and 58, the chopper circuit 42, the negative terminal 44 and the DC power source 16. Since the direction of the field current i is reversed, the voltage induced in the armature 12 has a polarity shown in FIG. 1. This induced voltage causes self-excitation of the field coil 38 via the chopper circuit 42, the regeneration diode 68, the armature 12, the sensor 34, the backward contactor 36, the field coil 38, the forward contactor 40 and the chopper circuit 42. This current rises the induced voltage rapidly.

Then, when the chopper circuit 42 is turned off, the excitation energy stored in the field coil 38 tends to cause the flow of current in the direction of the arrow. In other words, the voltage induced in the armature 12 and the magnetic energy in the field coil 38 cause the flow of regenerative current through a circuit comprising the free wheel diode 64, the DC power source 16, the regeneration diode 68, the armature 12, the sensor 34, the backward contactor 36, the field coil 38 and the forward contactor 40, and thus regenerative braking is effected.

When the rotational speed of the vehicle drops as the result of the regenerative braking, even if the duty cycle of the chopper circuit 42 is increased, the braking current does not reach a preset limiting value. However, if the chopper circuit 42 is held in the conductive condition, the current flows continuously via the armature 12, the sensor 34, the backward contactor 36, the field coil 38, the forward contactor 40, the chopper circuit 42 and the diode 68, and thus dynamic braking is effected. In this case, the energy is converted into a heat energy mainly by the internal resistance of the armature 12.

When the excitation coil 30 of the regeneration contactor 14 is deenergized, in FIG. 1 the terminals 20 and 26 are disconnected and the terminals 20 and 22 are connected. Thus, the chopper circuit 42 is turned off.

As a result, the induced voltage of the armature 12 is supplied via a closed circuit comprising the sensor 34, the plugging diode 66, the terminals 20 and 22 and the armature 12, and thus plugging braking is effected. During the plugging braking, no current flows to the field coil 38 but a voltage is generated in the armature 12 by the residual magnetism. When the electric motor 10 is stopped, the chopper circuit 42 is turned on again and the backward operation is started without any change in the main circuit.

Figure 3:
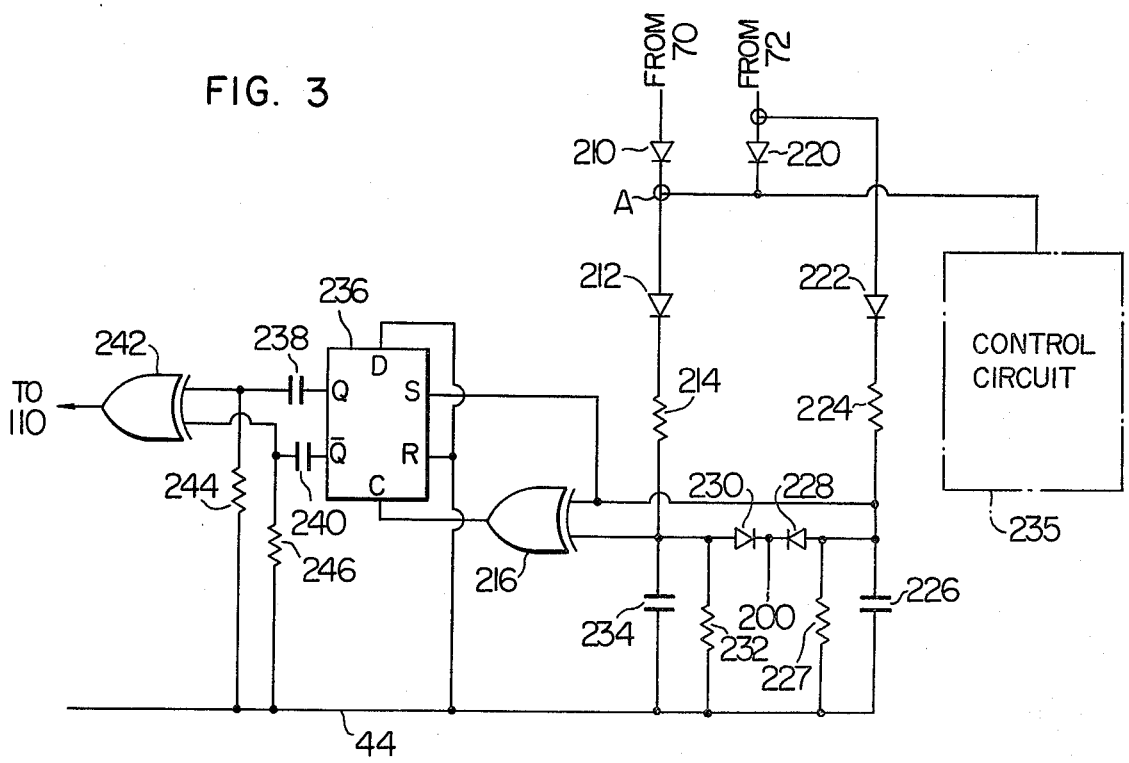
FIG. 3 is a circuit diagram showing another embodiment of the invention.

FIG. 3 is a circuit diagram of another embodiment of the invention, especially showing a circuit construction for generating the clock pulse in case where only a signal representing the logical sum of forward and backward signals, i.e. a forward+backward signal and a backward signal are available. In FIG. 3, the anode of a diode 212 is connected via a forward connected diode 210 to the forward switch 70 connected to the power source positive terminal 18 and the cathode of the diode 212 is connected to a resistor 214. The other end of the resistor 214 is connected to one input terminal of an exclusive OR 216 and a capacitor 234 whose other end is connected to the power source negative terminal 44. The backward switch 72 connected to the power source positive terminal 18 is connected to the anode of a diode 220 and the anode of a diode 222. The cathode of the diode 220 is connected to the anode of the diode 212 and the cathode of the diode 222 is connected to a resistor 224. The other end of the resistor 224 is connected to the other input terminal of the exclusive OR 216 and a capacitor 226. The other end of the capacitor 226 is connected to the power source negative terminal 44. The other end of the resistor 224 is also connected to a resistor 227 and the anode of a diode 228, and the other end of the resistor 227 is connected to the negative terminal 44. The cathode of the diode 228 is connected to the constant voltage line 200. The cathode of the diode 228 is also connected to the cathode of a diode 230 whose anode is connected to a resistor 232 and the capacitor 234. The other end of the resistor 232 is connected to the negative terminal 44.

The cathode of the diode 210 is connected to a control circuit 235.

The output terminal of the exclusive OR 216 is connected to the clock terminal of a D-type flip-flop 236 whose D terminal is connected to the negative terminal 44. Also the D-type flip-flop 236 has its S terminal connected to the resistor 224 and its R terminal connected to the negative terminal 44. The D-type flip-flop 236 has its output terminal or Q terminal connected to a capacitor 238 and its $\overline{Q}$ terminal connected to a capacitor 240, and the other end of the capacitor 238 is connected to one input terminal of an exclusive OR 242 and a resistor 244. The other end of the capacitor 240 is connected to the other input terminal of the exclusive OR 242 and a resistor 246. The resistors 246 and 244 are both connected to the power source negative terminal 44. The output terminal of the exclusive OR 242 is connected to the clock terminal 110 of the D-type flip-flop 104 of FIG. 2.

It will thus be seen that the circuitry of FIG. 3 is rendered operative when one or the other of the forward and backward switches 70 and 72 is turned on. Thus, where it is necessary to use the control circuit 235 which requires the terminal A of FIG. 3 for its input signal, the same effect as the circuitry of FIG. 2 can be obtained by simply adding a terminal B of the backward switch 72. In other words, the same processing can be effected with the reduced input signals. The diodes 230 and 228 are provided for the purpose of preventing the input voltage of the exclusive OR 216 from becoming excessively high, and the resistors 232 and 227 are respectively provided for the purpose of discharging the charge in the capacitors 234 and 226, respectively.

What is claimed is:

1. A braking control apparatus for an electric motor operated vehicle including a DC motor for operating the vehicle, contactor means for effecting change-over between forward and backward modes of operation of the vehicle and a chopper circuit having a duty cycle varying in response to an accelerator so as to control the speed of the vehicle, said apparatus comprising forward/backward change-over detecting means for detecting a change-over from said forward mode of operation to said backward mode of operation or vice versa, and regenerative braking activating means for effecting regenerative braking when said forward/backward change-over detecting means detects said change-over from said forward to said backward mode of operation or vice versa, said forward/backward change-over detecting means and said regenerative braking activating means including: first means for detecting the duty cycle of said chopper circuit; second means for detecting whether a level detected by said first means is higher or lower than a predetermined level; third means for detecting whether an output of said accelerator is greater than a predetermined value; fourth means for detecting the operation of forward/backward switch means so as to generate a clock signal; and fifth means for detecting that there is no output from said second means and that the value detected by said third means is greater than said predetermined value and responsive to said clock signal from said fourth means to energize contactor excitation coil means.

2. A brake control apparatus according to claim 1, wherein said contactor means includes switch means having a forward position corresponding to the forward mode of operation, a backward position corresponding to the backward mode of operation and an intermediate position corresponding to a neutral mode of operation, said regenerative braking activating means being enabled only in response to at least said forward/backward detecting means detecting completion of a change-over switching from said forward to said backward mode of operation or vice versa.

* * * * *